(12) United States Patent
Lieberman

(10) Patent No.: US 8,345,329 B2
(45) Date of Patent: Jan. 1, 2013

(54) SYSTEMS AND METHODS FOR IMPROVING IMAGE QUALITY IN IMAGE FORMING DEVICES

(75) Inventor: David Lieberman, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1327 days.

(21) Appl. No.: 11/858,996

(22) Filed: Sep. 21, 2007

(65) Prior Publication Data

US 2009/0080040 A1 Mar. 26, 2009

(51) Int. Cl.
*H04N 1/46* (2006.01)
(52) U.S. Cl. ............................ 358/504; 358/532; 358/534
(58) Field of Classification Search .................... None
See application file for complete search history.

(56) References Cited

U.S. PATENT DOCUMENTS

| | | | |
|---|---|---|---|
| 6,977,758 B2 | 12/2005 | Lieberman | |
| 2002/0073148 A1* | 6/2002 | Haines et al. | 709/204 |
| 2002/0163570 A1* | 11/2002 | Phillips | 347/224 |
| 2003/0218779 A1* | 11/2003 | Xu et al. | 358/3.07 |
| 2004/0150841 A1 | 8/2004 | Lieberman et al. | |
| 2009/0003909 A1* | 1/2009 | Spence | 399/400 |

\* cited by examiner

*Primary Examiner* — Vincent Rudolph
*Assistant Examiner* — Marcus T Riley
(74) *Attorney, Agent, or Firm* — Oliff & Berridge, PLC

(57) ABSTRACT

An image forming device may select from among a plurality of rendering parameters to include selectable halftone frequency candidates automatically based on an internal determination regarding an operating condition of the device to improve image quality for formed images. As a time varying function of the status and/or condition of the components and/or consumables employed in the image forming device, a capability is provided for the device to independently determine an optimal individual or set of rendering parameters to be employed based on a monitored device status. Available monitoring data for a current overall condition of the image forming device, to include monitoring a condition of the components and/or the consumables within the device, is used to allow the device to internally perform automatic adjustment of one or more image rendering parameters, including automatically implementing an optimal halftone frequency election scheme.

17 Claims, 2 Drawing Sheets

SYSTEMS AND METHODS FOR IMPROVING IMAGE QUALITY IN IMAGE FORMING DEVICES

BACKGROUND

This disclosure is directed to system and methods using an automated tag migration strategy to improve Image Quality (IQ), and/or to modify IQ according to a user's desires or requirements, of an image produced in an image forming device.

IQ for images formed in image forming devices is dependent on a number of complex and varyingly related factors. Among these factors are a time lapse or number of operations performed since a most recent service, repair, or replacement of one or more replaceable components and/or consumables in the image forming device. The IQ for images produced in the image forming device often degrades over time with the age of one or more replaceable components and/or consumables. When IQ deteriorates to such an extent that service is required, individual components may be serviced and cleaned, replaceable components and/or consumables may be replaced with fresh components or consumables, and calibration may be performed. As a result, IQ for images formed in the image forming device may be returned to an original level as when the device was new, the image forming device having been considered to be returned to a "pristine" condition.

Production image forming devices produce their highest IQ level immediately after recent repair functions or after replacing old consumables such as, for example, toner, with fresh material, and/or replacing aging components that degrade over time with new units. Because IQ generally decreases over time and with usage, a number of adjustments of parameters that are controllable within the image forming device, such as those that may be controllable within, for example, a digital front end (DFE) of an electrostatic image forming device, may be manipulated in order to attempt to maintain IQ at a highest level based on a degrading condition of the components and the consumables within the image forming device.

Measures of IQ are known to be decreasing functions of time following a calibration, individual part replacement and/or based on a condition of a consumable. IQ degradation curves may be plotted as functions of one or more parameters, such as a selected halftone frequency at which the image forming device is operated. The functional relationship to any specific rendering parameter, including a selected halftone frequency is generally a depiction of a trend in IQ rather that being based on an actual measurement. These functional relationships may be depicted as a representative illustration to show a robustness versus an initial IQ trade-off for example with respect to differing rendering parameters, such as, for example, halftone frequencies, over time.

A low frequency halftone is generally least stressful to the imaging system and therefore more robust and repeatable, but has the lowest initial IQ and, slowest rate of decline over time. Highest frequency halftones produce the highest initial IQ, but they are very stressful on the image forming device and suffer from significant IQ declines over comparatively shorter periods of time relative to the low halftone frequency performance. A medium frequency halftone may have a moderate initial IQ level and moderate rate of decline. Ideally, end users seek to maximize IQ over time. This can be done by manually selecting an appropriate halftone frequency candidate.

SUMMARY

Generally IQ decreases over time, as discussed above. This degradation may depend, among other factors, on a halftone frequency employed by the image forming device. A discussion of halftone dot encoding is included in, for example, U.S. Pat. No. 6,977,758 B2 to Lieberman, the inventor of this application. The entire disclosure of the previous application is incorporated by reference herein. Further discussion of the use of a halftone frequency in an image forming device is understood by those of ordinary skill in the art, and as such, will not be further discussed in this application.

Initially, higher IQ is achieved using relatively stressful higher frequency halftones. Such high frequency halftones are known to stress the components in the image forming devices. Later a more robust lower frequency halftone will provide a most acceptable IQ for the system given a number of other considerations.

Conventionally, end users are provided a recommended maintenance schedule, calibration procedure and a collection of rendering parameter, including halftone frequency candidates, from which to choose. Such end users are likely to benefit by learning from experience how to optimize overall IQ by adopting some manual rendering parameter or halftone frequency selection strategy that depends on a current operating condition of a given image forming device.

As image forming devices have become more complex, such devices routinely monitor the condition of internal components, including replaceable components ("components), and/or consumables used in the production of images within the image forming device. Such monitoring may include, for example, monitoring developer material age, toner material age, photoreceptor component age, planned service schedules for each component and consumable and the corresponding time interval since the last service to either components or consumables, and overall device usage. Based on an ability of a specific image forming device to monitor age, usage, and status of components or consumables, data that may prove advantageous in estimating an optimal employment window within which to modify one or more image enhancement parameters, including automatic selection of a halftone frequency and other rendering parameters in the image forming device to, for example, potentially switch away from more stressful settings that are likely to produce image quality levels that are suspect, to a more robust and sustainable collection of settings, is available.

Based on the availability of monitoring data, and a desire to achieve the highest reliable level of IQ for a current overall condition of an image forming device, to include, but not be restricted to, a condition of one or more components and/or a condition of one or more consumables, within the image forming device, it would be advantageous to provide a capability that would allow the image forming device or digital front end (DFE) preprocessor to internally perform automatic adjustment of one or more image rendering parameters, including automatically implementing an optimal halftone frequency and other rendering parameter selection scheme.

In various exemplary embodiments, the systems and methods according to this disclosure may provide a capability by which an image forming device may select from among a plurality of halftone frequency and/or other rendering parameter candidates automatically (or following an approval received from a user in response to a prompt) based on an internal determination regarding an operating condition of an image forming device.

In various exemplary embodiments, the systems and methods according to this disclosure may provide, as a time varying function of the status and/or condition of one or more components and/or one or more consumables employed in an image forming device, an ability for the image forming device to independently determine optimal halftone frequency and/ or other rendering parameter candidates to be employed based on a monitored device status.

In various exemplary embodiments, the systems and methods according to this disclosure may provide a capability to monitor and record information pertinent to an operating condition of an image forming device. Such information may be, for example, stored in data logs within the image forming device. In addition to conventional uses for such information by which consumables may be ordered and/or required maintenance procedures on the image forming device may be scheduled, this information may also be made available to an automated determination unit within the image forming device to attempt to optimize IQ and/or image rendering over time depending on an operating state and/or aging condition of one or more components and/or one of more consumables in the image forming device to adjust one or more image rendering parameters, or specifically to change a halftone frequency selection at an optimal time, in an attempt to achieve the highest reliable level of IQ based on a current operating condition of the image forming device.

It should be appreciated that not only may an adjustment of a halftone selection frequency prove advantageous, but other adjustments to one or more image rendering parameters may also aid in reducing system drift and maximizing IQ for the images formed in the image forming device. Such other adjustable one or more image rendering parameters may include, but are not limited to, reinforcing edge strength by adding outlining which may be scheduled to appear over time as IQ deteriorates in an image forming device. Applying more generous trapping characteristics, and/or more conservative under-color removal schemes, to images formed in the image forming device may also provide a capability to advantageously affect IQ based on the current operating condition of an image forming device as it generally decreases over time. In other words, any one or more additional image rendering parameters such as, for example, adjusting a color transformation, modifying a binary raster image process setting, or introducing an edge-sharpening in the image forming undertaken by the image forming device, may prove advantageous and/or may supplement improvements in IQ based on optimal selection of a halftone frequency for the current operating condition of the image forming device. One or more of these rendering parameters may be adjustable over time based on a determination made within the image forming device and/or DFE preprocessor of the system.

It should be appreciated that modifying values of any of the above-discussed or other related rendering parameters to increase the usage of more robust image forming techniques over time can extend the life of aging components, reduce the quantity of disposed consumables, and decrease the frequency of service calls, among other benefits that may be realized from performing automated, or user-approved, adjustment of one or more image rendering parameters, including optimal halftone frequency selection, within the image forming device based on a condition of components and/or consumables, or the length of time since the previous maintenance actions were performed on the image forming device.

These and other features and advantages of the disclosed systems and methods are described in, or apparent from, the following detailed description of various exemplary embodiments.

BRIEF DESCRIPTION OF THE DRAWINGS

Various exemplary embodiments of disclosed systems and methods for automated adjustment of rendering parameters to effect an optimal IQ based on a current operating condition of an image forming device will be described, in detail, with reference to the following drawings wherein.

DETAILED DESCRIPTION OF EMBODIMENTS

Figure 1:
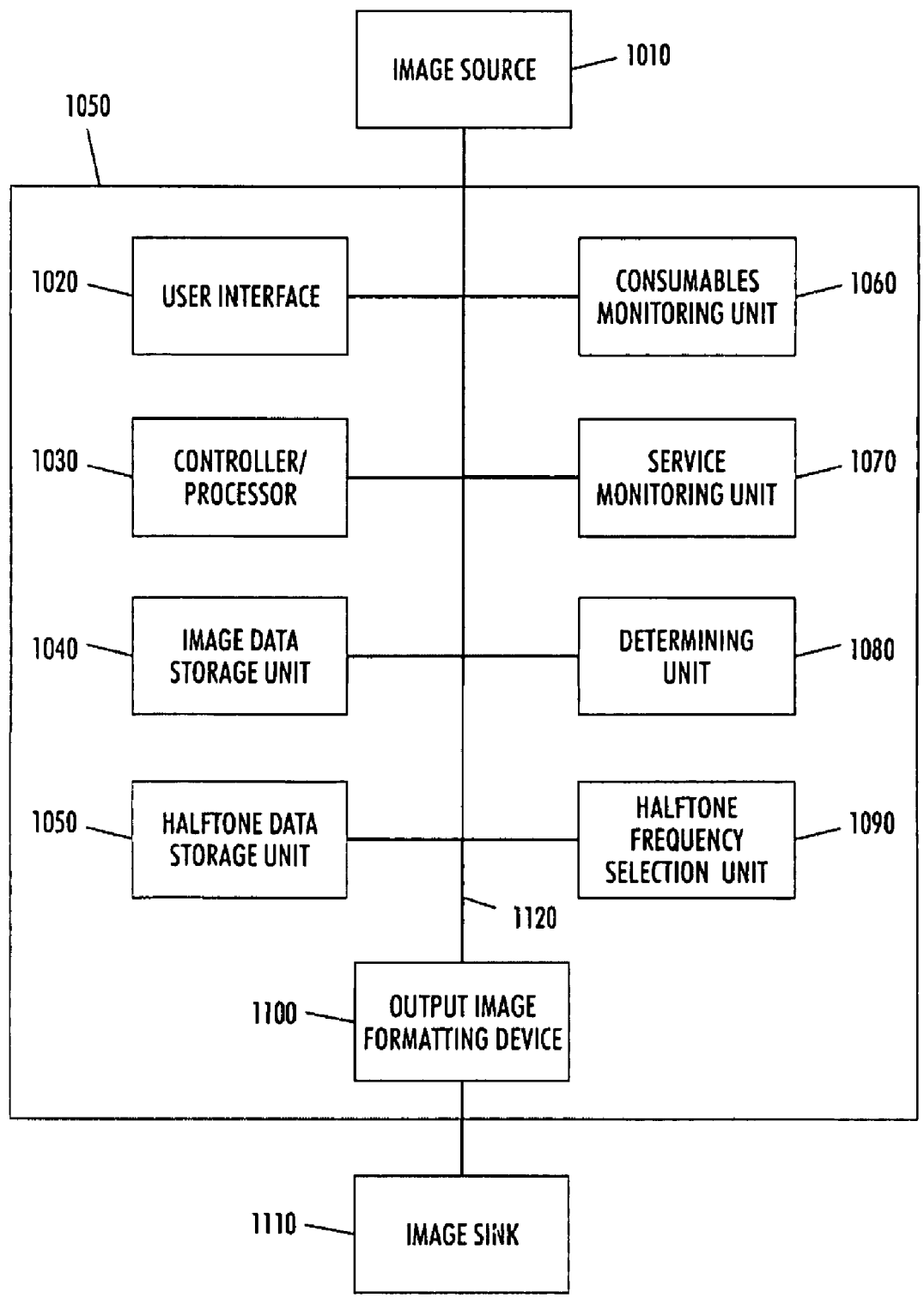
FIG. 1 illustrates a block diagram of an exemplary embodiment of a system for image quality compensation based on automated adjustment of one or more IQ-related rendering parameters in an image forming device.

The following embodiments illustrate examples of systems and methods for compensating for IQ degradation, or for achieving a certain desired IQ, in an image forming device by adjusting one or more image rendering parameters in the image forming device over time. The following description of various exemplary embodiments for IQ adjustment, and specifically for automated rendering parameter modification, to include user approval options, in an image processing system and/or in an image forming device, may refer to one specific type of image forming device, such as, for example, an electrostatic or xerographic image forming device, and discussion of various terms related to image correction within such an image forming device, for the sake of clarity, and ease of depiction and description. For example, such terms will include reference to image quality (IQ) as a recognized output condition, and/or a digital front end (DFE) preprocessor as a specific component that may be modified with the systems and methods according to this disclosure to include an automated determining methodology by which to, for example, optimally select optimal rendering parameters, to include halftone frequencies from among a plurality of candidate frequencies, to be employed in the image forming device. It should be appreciated, however, that, although the systems and methods according to this disclosure may be applicable to such a specific application, the depictions and/or descriptions included in this disclosure are not intended to be limited to any specific application. Any system and/or method for image forming that may advantageously apply the IQ adjustment methodologies and/or image rendering parameter selection schemes described in exemplary manner in this disclosure are contemplated. The term "halftone frequency" may be referred to throughout this disclosure as a specific example of a rendering parameter that may adjusted according to disclosed methods. The use of this term is, in no way, intended to be limiting to any system component or method step is intended to encompass automated, or user-approved, adjustment of any manner of rendering parameter in an image forming device. In referring to, for example, image forming devices as this term is to be interpreted in this disclosure, such devices may include, but are not limited to, copiers, printers, scanners, facsimile machines, xerographic image forming devices, and/or any other now known or later-developed system or device for producing, reproducing and/or potentially transmitting or receiving high quality monochrome and/or color images.

Components used in image forming devices such as, for example, photoreceptors in xerographic image forming devices, are manufactured to tolerances that leave their performance characteristics to vary over time. IQ variance may occur based on an aging process of one or more of such components and/or a state or condition of one of many consumables employed by the image forming device. A drift in the quality of an output image may be mediated by applying and/or optimizing one or more of the image rendering parameters discussed below.

FIG. 1 illustrates a block diagram of an exemplary embodiment of a system 1000 for image quality compensation based on automated adjustment of one or more IQ-related rendering parameters in an image forming device. As shown in FIG. 1, an exemplary system 1000 may include an image source 1010, a user interface 1020, a controller/processor 1030, one or more image data storage units 1040, one or more additional data storage units that may, for example, store rendering parameter or halftone frequency selection data, such as a halftone data storage unit 1050, a consumables monitoring unit 1060, a service monitoring unit 1070, a determining unit 1080, a halftone frequency selection unit 1090, an output image formatting device 1100, and some form of image sink 1110, all connected via a data/control bus 1120.

In various exemplary embodiments, input images obtained via the image source 1010 may be manipulated by the image forming device based on predetermined and/or adjustable parameters such that an output image formatting device 1100 may properly format output image data in a manner to be compatible with the image sink 1110. The image data output to the image sink 1110 will have a certain IQ that is dependent on numerous factors, including a set of predetermined and/or adjustable image rendering parameters within the image forming device.

The image source 1010, it should be recognized, may be any form of image receiving unit in, or associated with, an image forming device. The image source 1010 may include, for example, an image scanning device, an image digital data storage device, a digital still or video camera, and/or a locally or remotely located computer and/or data manipulation work station, or any other now known or later-developed device that is capable of generating, or reproducing, electronic digital source image data. The image source 1010 may be integrated with, or connected remotely to, the image forming device. The image source 1010, if a separate device or unit from the image forming device, may be connected to the image forming device by either a direct or network data communication link, including any one or more of a wired, wireless, optical and/or like link. The image source may include a capability to store input image data. Alternatively, the system 1000 may internally store input image data in, for example, an image data storage unit 1040.

A user interface 1020 may be provided in the form of, for example, a graphical user interface associated with the image forming device, in order, where appropriate, to query a user, and/or receive user input, regarding variable rendering parameters for adjustment, and/or IQ adjustable rendering parameters, within the system 1000 that may facilitate improved image production and/or reproduction, and may enhance IQ. Such a user interface 1020 may afford a user an opportunity to "approve" modification of automatically determined modifications to one or more rendering parameters in reply to, for example a user query, prior to implementation of any modification of a rendering parameter in the image forming device. It should be appreciated that the user interface 1020 may also comprise, for example, an additional data storage medium and compatible digital data storage medium reading device, or a locally or remotely-located computer or other data manipulation work station that may be in data communication with the exemplary system 1000.

A controller/processor 1030 may be provided to control overall operation of the system 1000, or otherwise to specifically control individual functions related to improving IQ, to query databases stored within one or more data storage units, and to carry out operations based on determinations made in other units within the system 1000. The controller/processor 1030 may process image data and other monitored parameters received, for example, from one or more of a consumables monitoring unit 1060, a service monitoring unit 1070, or otherwise, to provide input to a determining unit 1080 to aid in making determinations automatically within the image forming device that will support optimal IQ adjustment based on, for example, a status and/or condition of one or more components and/or one or more consumables employed within the image forming device.

Data storage units such as those depicted as an image data storage unit 1040 and a halftone data storage unit 1050 may be provided to store data regarding operating parameters of the image forming device that do not change over time, or that are subject to drift based on a condition of one or more components and/or one or more consumables employed within the image forming device. As such, data storage units 1040, 1050 may additionally store, for example, preset toner reproduction curves (TRCs) to which the system 1000 may refer in producing and/or reproducing color images on output image receiving media. Additionally, storage space for other operating parameters of the system 1000 may be provided. There may be provision for a database storing section to store one or more databases. These databases may contain, among other rendering parameter data, a plurality of halftone frequency data parameters. The rendering parameter data, including the plurality of halftone frequency data parameters, may define conditions that may be monitored by one or more monitoring units 1060, 1070 in order that the system may reference these conditions in automatically making a determination regarding a selection of one or more rendering parameters, including a halftone frequency, to be employed by the image forming device. Such databases may be pre-stored and/or routinely updatable to include certain predetermined parameters and/or threshold cross-over points to aid, via the controller/processor 1030 or a separate determining unit 1080, as will be discussed in greater detail below, in making a determination when certain rendering parameters, to include one of a plurality of halftone frequency settings for the image forming device, should be automatically changed, or changed following an approval received from a user in response to a prompt, to attempt to optimize IQ for the current condition of the image forming device, to include the current condition of one or more components and/or one or more consumables employed by the image forming device.

A consumables monitoring unit 1060 may be provided to monitor the condition of one or more consumables employed by the image forming device. Such a consumables monitoring unit 1060 may monitor, for example, an amount of consumables used and/or remaining, a number of image forming operations undertaken since the consumables were last replaced, a time lapse since the consumables were last replaced, and/or environmental conditions, e.g., temperature and/or humidity within the image forming device, or surrounding the image forming device, that may affect a condition of one or more consumables employed by the image forming device. The consumables monitoring unit 1060 may maintain a running and/or real-time update of a consumables status, or may, for example, update one or more data fields specifically for the storage of such information in one or more of the data storage units 1040, 1050, or otherwise within the image forming device.

It is recognized that status, condition and/or depletion of one or more consumables within the image forming device may be routinely monitored to several beneficial purposes. In instances where such information is already provided within the image forming device, a separate consumables monitoring unit 1010 within the exemplary system 1000 may not be required. In other words, any manner by which such data may be provided to the system 1000 by which a determination can be made, as will be discussed below, is contemplated.

A service monitoring unit 1070 may be provided to monitor a service condition of the image forming device overall, or of one or more components, including replaceable components, within the image forming device. Further, a service monitoring unit 1070 may be provided to autonomously monitor a condition of status of one or more consumables employed by the image forming device thereby obviating a need for a separate consumables monitoring unit 1060. The service monitoring unit 1070 may monitor, for example, a service life of a given component used and/or remaining, a number of image forming operations undertaken since a last service, repair and/or replacement of one or more components, a time lapse since the last service, repair, replacement and/or calibration of one or more components within the image forming device, or for the image forming device overall, was accomplished. The service monitoring unit 1070 may according to some predetermined schedule, predict a requirement for a next service to be performed on the image forming device, or on one or more components, including replaceable components, within the image forming device. Information available from such a service monitoring unit 1070 may be employed in a determination of adjustment of one or more other image quality rendering parameters available within the image forming device, as will be discussed further below.

As with consumables monitoring, it should be recognized that many image forming devices currently monitor servicing data. In such instances, a separate service monitoring unit 1070 may not be required as long as the information available to the determination is made somewhere within the image forming device. Also, it should be recognized that the service monitoring unit may store autonomously the service information, or may update a database within one or more of the data storage units 1040, 1050 which maintain data fields for monitoring servicing of the image forming device overall, or one or more components, including replaceable components, within the image forming device.

A determining unit 1080 may be provided to execute a determination by which, based on one or more input parameters regarding IQ, one or more image rendering parameters available within the image forming device, to include, but not be limited to, selection of an optimal halftone frequency from among a plurality of available halftone frequencies, may be manipulated to optimize IQ based on a present condition of one or more components, including replaceable components in, and/or one or more consumables employed by, the image forming device. Based on the determination made by such a determining unit 1080 according to a predetermined and/or pre-stored methodology and/or algorithm, such a determining unit 1080 may query one or more databases of available information stored within one or more data storage units 1040, 1050 to determine parameters and/or thresholds by which to provide an output determination that one or more image rendering parameters available within the image forming device, to include an optimal halftone frequency selection, should be modified to optimize IQ based on a current condition of the image forming device, one or more components, including replaceable components in the image forming device, and/or one or more consumables employed by the image forming device, the conditions of all of which may be monitored by individual or combined monitoring units 1060, 1070, or otherwise.

A halftone frequency selection unit 1090 may be provided to receive an input from, for example, a determining unit 1080, and to select, from among a plurality of available halftone frequencies that may be employed by the image forming device, the halftone frequency which optimizes IQ for the current condition of the image forming device. It should be appreciated that such a halftone frequency selection unit 1090 may, in addition to indicating which of a plurality of halftone frequencies should be selected, also indicate adjustments to one or more other image rendering parameters available within the image forming device. Such other image rendering parameters may include, but not be limited to, reinforcing edge strength by adding outlining, applying a more generous trapping characteristic and/or more conservative under-color removal scheme, or modifying either a color transformation scheme or a binary raster image process setting, or other such like parameter within the image forming device. In other words, any manner by which a rendering parameter may be modified to increase employment of what are considered more robust image forming techniques, specifically designed to optimize IQ and to, for example, extend available service life of one or more aging components, reduce the quantity of disposed consumables and/or decrease a frequency for service/repair operations that need to be undertaken within the image forming device, are contemplated.

The systems and methods according to this disclosure contemplate an image sink 1110 that is an output image receiving medium upon which a hard-copy image may be formed. Other image sinks 1110, however, to include, for example, a digital display for review of an output image, and evaluation of an IQ of such an output image based on current operating conditions of the image forming device, particularly which may be associated with potential automatic and/or user-controllable adjustment of certain rendering parameters, may be employed.

It should be appreciated that although depicted as a generally integral system 1000 in FIG. 1, each of the devices and/or units depicted as internal to, or alternatively externally connected to, the exemplary system 1000, could: be either units and/or capabilities internal to an image forming device, or individually, or in combination, attached as separate units by any path which facilitates data communication such as, for example, digital data communication of image data information, and coordination, between such units and/or devices. Such data communication may be undertaken by, for example, one or more of a wired, a wireless, an optical, or other like connection, either individually or via some form of network communication between the individual devices and/or components and the overall system 1000 supporting image formation in an image forming device.

Any of the data storage units depicted, or alternately described above, may be implemented using an appropriate combination of alterable, volatile or non-volatile memory, or non-alterable, or fixed, memory. The alterable memory, whether volatile or non-volatile, may be implemented using any one or more of static or dynamic RAM, or for example, any computer-readable type media and compatible media reader, a hard drive, a flash memory, or any other like memory medium and/or device. Similarly, the non-alterable or fixed memory may be implemented using any one or more of ROM, PROM, EPROM, EEPROM, optical or OM disk such as, for example, CD-ROM, DVD-ROM, or other disk-type media and compatible disk drive, or any other like memory storage medium and/or device.

It should be appreciated that, given the required inputs, to include, but not be limited to, appropriate databases, as generally described above, and/or inputs regarding differing monitoring capabilities within, or in communication with, the exemplary system 1000, software algorithms, hardware/firmware circuits, or any combination of software, hardware, and/or firmware control elements may be used to implement the individual devices and/or units in the exemplary system 1000.

The computations necessary to establish and to determine selection and/or adjustment of rendering parameters such as, for example, selection from among a plurality of available halftone frequencies, based on associated parameters, may be implemented within a circuit in the image forming device itself. Alternatively, such computations may be performed on a programmable general purpose computer, a special purpose computer, a programmed microprocessor or microcontroller, or some form of programmed digital signal processor, peripheral integrated circuit element ASIC or other integrated circuit, a hard-wired electronic or logic circuit such as a discrete element circuit, a programmable logic device such as a PLD, PLA, FGPA or PAL or the like, or may even be manipulated through manual adjustment of one or more of the operating parameters, or coefficients that may be associated with one or more of the operating parameters.

Figure 2:
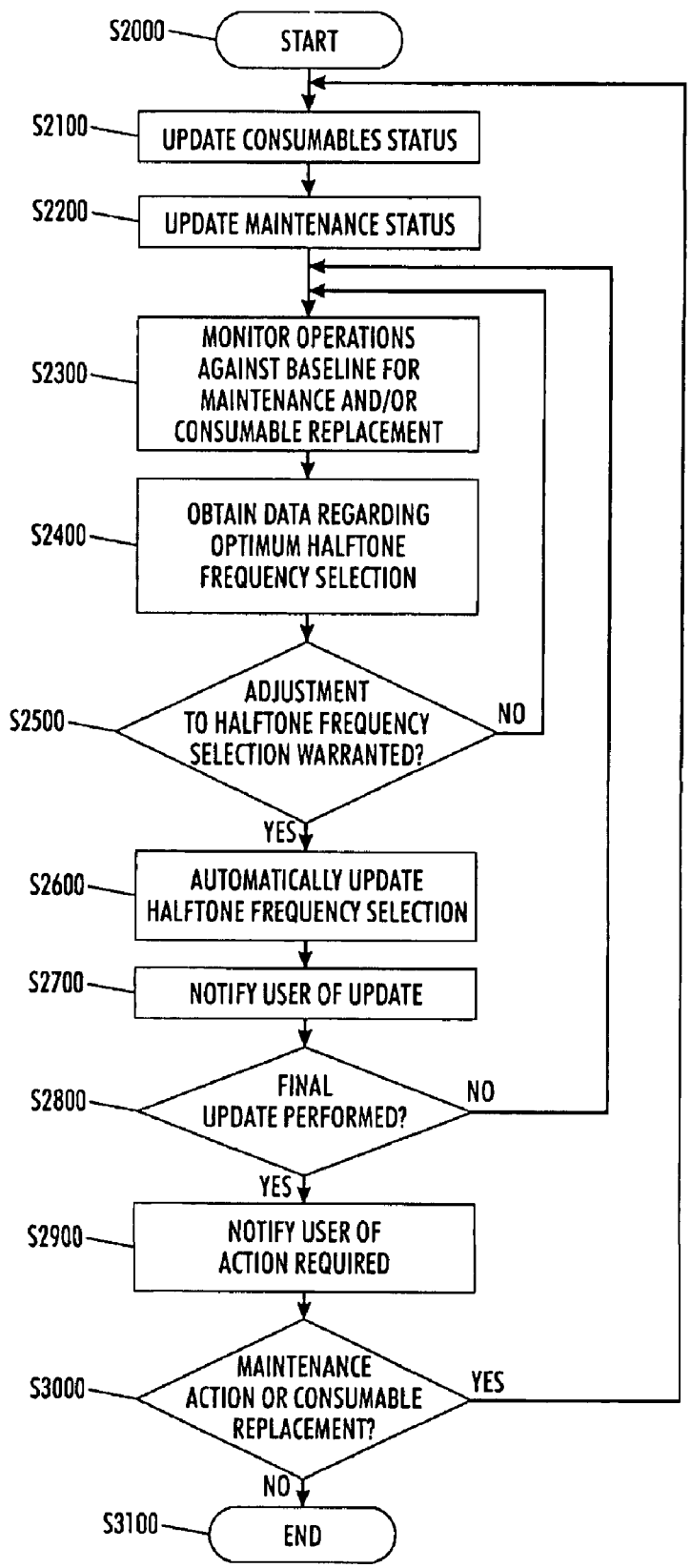
FIG. 2 illustrates a flowchart of an exemplary embodiment of a method for improving IQ in an image forming device by automatically adjusting one or more rendering parameters based on a condition of an image forming device over time.

FIG. 2 illustrates a flowchart of an exemplary embodiment of a method for improving IQ in an image forming device by automatically adjusting one or more rendering parameters based on a condition of an image forming device over time. As shown in FIG. 2, operation of the method commences at step S2000 and may proceed directly to step S2300, or to step S2100 and/or step S2200.

In step S2100, a status of consumables employed in an image forming device may be updated. Such update may be necessitated by, for example, replacement of one or more consumables in the image forming device, or based on, for example, a change in an environmental condition, e.g., temperature or humidity within, or surrounding, the image forming device that may affect the quality and/or availability of one or more of the consumables employed in the image forming device. Operation of the method may continue directly to step S2300, or to step S2200.

In step S2200, a maintenance status of the image forming device may be updated. Such update may occur based on any service, repair, and/or maintenance action being performed on the image forming device. Such action may include, but not be limited to, for example, repairing the image forming device overall, repairing and/or replacing one or more components within the image forming device, and/or calibrating the image forming device according to one or more calibration schemes, each of the actions intended as re-baselining a "pristine" condition of the image forming device. Operation of the method continues to step S2300.

It should be appreciated that IQ in an image forming device is likely at a highest level immediately after replacement of one or more consumables with fresh consumables, or immediately after a service, repair and/or maintenance action that cleans, repairs, and/or replaces worn components within the image forming device. Generally in each case, a calibration action will be performed in an effort to optimize IQ to a highest level. It should be recognized that deterioration in IQ in the image forming device, albeit slight, will commence as consumables begin to be depleted, components begin to wear or age, and/or operational settings begin to drift, with the lapse of time and with each image forming operation undertaken by the image forming device following consumables replacement, service, repair or maintenance action, and/or system calibration.

In step S2300, operations of the image forming device are monitored against a baseline for maintenance and/or consumables replacement as an indication regarding how IQ may degrade through aging and use following actions to restore the "pristine" condition of the image forming device through service and/or consumables replacement and/or calibration, as discussed above. It is recognized that indicia of IQ are known to be decreasing functions of time following calibration, replacement of components, and/or based on an age and use of consumables. As such, monitoring of consumables and/or required maintenance procedures provide indicators regarding measures of IQ that can be tracked over time based on the monitoring. Operation of the method continues to step S2400.

In step S2400, data regarding an optimum halftone frequency selection may be obtained. It is recognized that IQ degradation may be plotted as a function, for example, of a plurality of available halftone frequencies to be employed by an image forming device. Such plot is not generally based on an actual measurement, but rather based on a predictive evaluation of a qualitative degradation in IQ over time. It is recognized as a representative illustration to show, for example, a plot of a robustness versus an initial IQ trade-off in a specific image forming device. It is further recognized that highest frequency halftones produce highest initial IQ. However, highest frequency halftones are stressful on the image forming device employing such halftone frequencies and cause the image forming device to suffer earlier onset of higher rate declines in IQ. Lower frequency halftones are more robust, but these produce the lowest initial IQ. Coincidentally, lowest frequency halftones realize a lowest rate of decline over time. Predictably, medium frequency halftones realize a moderate initial IQ level and a moderate rate of decline over time. Data relating to an optimum halftone frequency to be selected for a current condition of, for example, the image forming device, one or more components, including replaceable components within the image forming device and/or one or more consumables, may be provided. Such information may, for example, be stored in one or more data storage devices within an image forming device as a database, or otherwise. Operation of the method continues to step S2500.

Step S2500 is a determination step in which a determination is made whether an adjustment to a halftone frequency selection is warranted based on the information available from a combination of steps S2300 and S2400.

If in step S2500, it is determined that an adjustment to the halftone frequency selection is not warranted, operation of the method reverts to step S2300 where monitoring continues.

If in step S2500, a determination is made that adjustment to a halftone frequency selection is warranted, operation of the method proceeds to step S2600.

In step S2600, an optimum halftone frequency, as may be determined via the determination undertaken in step S2500, is automatically updated and/or employed in the image forming device to optimize IQ based on the current operating parameters of the image forming device. Operation of the method continues to one or more of steps S2700-S3000, or directly to step S3100 where operation of the method ceases.

It should be appreciated that not only may an appropriate halftone frequency be updated, but in addition to changing a halftone frequency selection, one or more of other image rendering parameters may be adjusted, in addition to, or apart from, selecting an optimum halftone frequency. Such image rendering parameters may include, but are not limited to, modifying a color transformation, modifying a binary raster image processing setting, or undertaking one or more edge-sharpened enhancement parameters by, for example, adding, outlining, and/or applying a more generous trapping characteristic and/or a more conservative under-color removal scheme. Any or all of these adjustments are contemplated as being a part of, and/or integral to, step S2600 with an intention of, among other objectives, optimizing IQ for the current state of components and/or consumables in the image forming device. Further, it should be appreciated that once a determination is made that any of these rendering parameters should be modified, a user may be prompted, for example via some form of user interface, to confirm, or otherwise approve the rendering parameter modification.

Optimally employing the most robust image forming techniques against a desire for highest IQ may, for example, extend the life of aging components in the image forming device, reduce the quantity of disposed consumables in the image forming device, and decrease overall frequency of service/maintenance actions that need to undertaken with reference to maintaining IQ in the image forming device.

It should be recognized that one or more of the above steps of monitoring, determining and selecting may be undertaken in, for example, DFE preprocessor of an image forming device such as, for example, a xerographic image forming device.

In step S2700, a user may be notified of an update to the halftone frequency selection employed by the image forming device, or to an adjustment to any one or more of other rendering parameters that may have been updated to enhance IQ based on the current operating condition of the image forming device. It should be appreciated that such notification may occur by any means available by which such notification may be adequately presented. Among these means are, for example, displaying some form of message on a graphical user interface and/or by producing a hard copy output message in the image forming device to inform the user of the update.

In step S2800, a determination is made whether the most recent updates are the last updates that can be made to attempt to optimize IQ based on the current and/or projected condition of the image forming device.

If in step S2800, it is determined that these are not the final updates that could have been performed, i.e., there are still adjustments that can be made in the future to one or more rendering parameters, such as, a halftone frequency, based on continuing deteriorating capability of the image forming device to improve, enhance or otherwise optimize IQ in the image forming device, operation of the method reverts to step S2300 where monitoring of the operation of the image forming device continues.

If in step S2800, it is determined that these are the final updates to any one or more of the adjustable rendering parameters, to include: update of the halftone frequency selection from among the plurality of available halftone frequency selections, operation of the method may proceed to one or more of steps S2900 and S3000, or directly to step S3100 where operation of the method ceases.

In step S2900, a user may be notified of a maintenance, service, calibration or consumables replacement action that should be undertaken because no further internal updates to any of the one or more image rendering parameters available within the image forming device, including a selection of an optimal halftone frequency has been determined may improve or even optimize IQ. Such notifications may occur in any manner that is suitable to a user such as those described above with respect to step S2700. Alternatively, where equipped, an image forming device may be provided with the capability to automatically, via some communications connection with a repair facility, notify a repair facility of a need for service, calibration and/or consumables replacement.

Step S3000 is a determination step for determining whether maintenance action or consumables replacement has been undertaken.

If in step S3000 it is determined that consumables replacement and/or maintenance action has been undertaken, operation of the method may revert to step S2100 and one or more of an update of a consumables status or an update of a maintenance status may proceed.

If in step S3000 it is determined that maintenance action or consumables replacement has not been undertaken operation of the method proceeds to step S3100 where operation of the method ceases.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. An image forming device, comprising:
   an image forming section for forming images according to one of a plurality of selectable rendering parameters;
   at least one data storage unit that stores data relating to the plurality of selectable rendering parameters;
   at least one monitoring unit for monitoring a condition in the image forming device that affects image quality for the images formed in the image forming section;
   a determining unit that automatically determines which one of the plurality of selectable rendering parameters is to be modified by the image forming section based on data from the at least one monitoring unit; and
   a selection unit that instructs the image forming section to modify the determined one of the plurality of selectable rendering parameters according to the determination, wherein
   the data relating to the plurality of selectable rendering parameters comprising at least data regarding an affect on image quality that each of a plurality of selectable halftone frequencies has with respect to the monitored condition, and
   the selection unit instructing the image forming section to select one of the plurality of selectable halftone frequencies according to the determination, wherein
   each of the plurality of selectable halftone frequencies controls a different image resolution of the formed image, and
   each of the plurality of selectable halftone frequencies is automatically updated and employed in the image forming device according to the determination.

2. The image forming device of claim 1, wherein the at least one monitoring unit is at least one of
   a consumables monitoring unit that monitors operation of the image forming device according to the last time that one or more consumables in the image forming device was replaced, or
   a service monitoring unit that monitors operation of the image forming device according to the last time that the image forming device was serviced.

3. The image forming device of claim 1, the at least one monitoring unit monitoring a number of images formed since a last of at least one of replacement of one or more consumables or service to one or more components of the image forming device.

4. The image forming device of claim 1, the at least one monitoring unit monitoring an amount of consumables consumed.

5. The image forming device of claim 1, the at least one monitoring unit monitoring an operating time since a last service action was performed.

6. The image forming device according to claim 1, wherein:
the determining unit automatically determines an adjustment for at least another of the plurality of selectable rendering parameters available within the image forming device used by the image forming section based on data from the at least one monitoring unit, and
the selection unit instructs the image forming section to adjust the at least another of the plurality of selectable rendering parameters available within the image forming device according to the determination.

7. The image forming device of claim 1, the plurality of selectable rendering parameters available within the image forming device comprising at least one of a color transformation, a binary raster image processing setting, or an edge-sharpening in the image forming undertaken by the image forming section.

8. The image forming device of claim 1, further comprising a notification unit by which a user may be at least one of prompted to approve a change in rendering parameters or notified of a change in rendering parameters of the image forming device.

9. The image forming device of claim 1, wherein at least one of the at least one of the at least one monitoring unit, the determining unit or the selection unit is a component of a digital front end of the image forming device.

10. The image forming device of claim 1, wherein the image forming device is an electrographic image forming device 11. The image forming device of claim 1, wherein the image forming device is a xerographic image forming device.

12. A method for optimizing image quality in an image forming device, comprising:
monitoring a condition in an image forming device that affects image quality for the images formed in an image forming section of the image forming device, the image forming section forming images according to one of a plurality of selectable rendering parameters;
storing data relating to the plurality of selectable rendering parameters by at least one data storage unit, the data relating to the plurality of selectable rendering parameters comprising at least data regarding an affect on image quality that each of a plurality of selectable halftone frequencies has with respect to the monitored condition;
automatically determining which of the plurality of selectable rendering parameters is to be modified by the image forming section based on data regarding the monitored condition; and
instructing the image forming section to modify the one of the plurality of selectable rendering parameters and to select one of the plurality of selectable halftone frequencies according to the determination, wherein
each of the plurality of selectable halftone frequencies controls a different image resolution of the formed image, and
each of the plurality of selectable halftone frequencies is automatically updated and employed in the image forming device according to the determination.

13. The method of claim 12, wherein the monitored condition is at least one of
operation of the image forming device according to a last time that one or more consumables in the image forming device was replaced,
operation of the image forming device according to a last time that the image forming device was serviced,
a number of images formed since a last of at least one of replacement of a consumables or a service to one or more components of the image forming device was undertaken,
an amount of consumables consumed, or
an operating time since a last service action was performed.

14. The method of claim 12, further comprising:
automatically determining an adjustment for at least another of the plurality of selectable rendering parameters available within the image forming device used by the image forming section based on data on the monitored condition; and
instructing the image forming section to adjust the at least another of the plurality of selectable rendering parameters available within the image forming device according to the determination,
wherein the plurality of selectable rendering parameters available within the image forming device comprises at least one of a color transformation, a binary raster image processing setting, or an edge-sharpening in the image forming undertaken by the image forming section.

15. The method of claim 12, further comprising at least one of prompting a user to approve a change in rendering parameters or notifying a user of a change in rendering parameters of the image forming device.

16. The method of claim 12, wherein at least one of the at least one of monitoring, determining or instructing are carried out in a digital front end of an image forming device.

17. A non-transitory computer-readable storage medium storing a computer program for causing a computer to execute the method of claim 12.

* * * * *